United States Patent Office 3,652,687
Patented Mar. 28, 1972

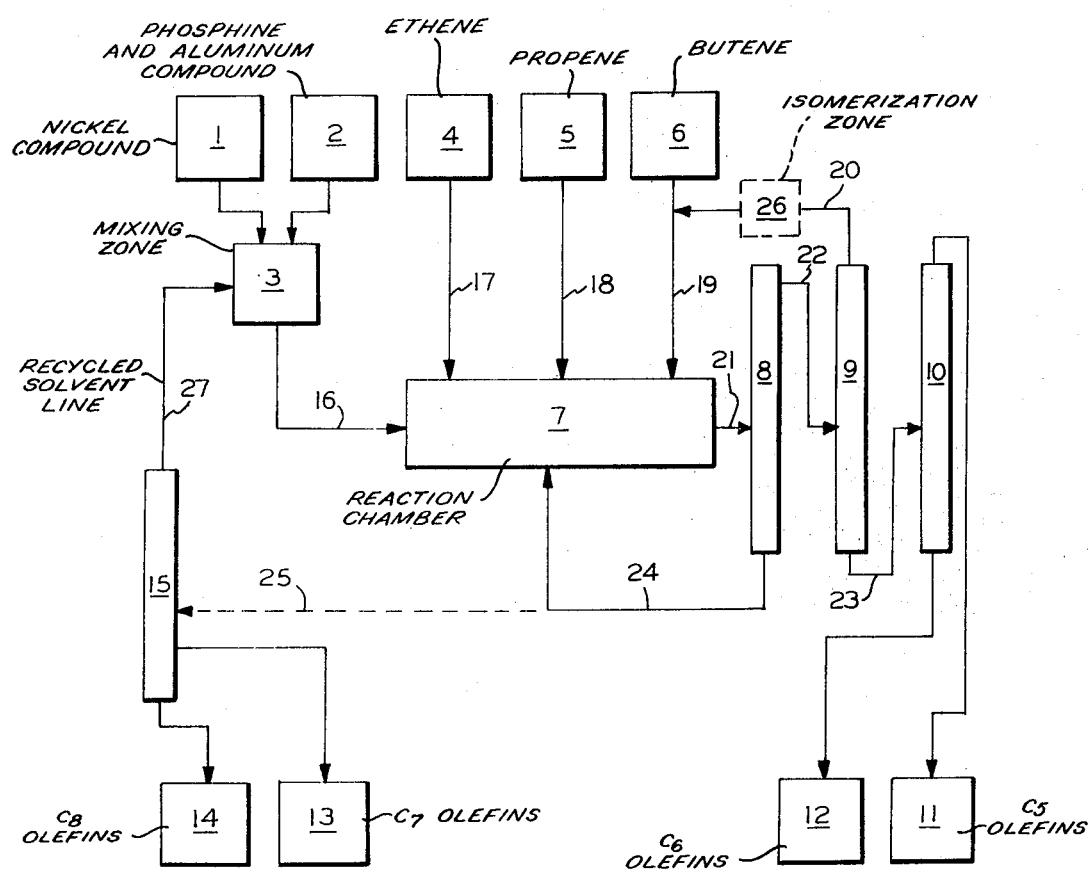

3,652,687
PROCESS FOR THE PRODUCTION OF C₅–C₈ OLEFINES
Normann Bergem, Oslo, Ulf Blindheim, Skedsmokorset, Olav-Torgeir Onsager, Baerum, and Hagbarth Wang, Oslo, Norway, assignors to Sentralinstitutt for Industriell Forskning, Oslo, Norway
Filed July 9, 1968, Ser. No. 743,435
Claims priority, application Norway, July 17, 1967, 169,072
Int. Cl. C07c 3/10
U.S. Cl. 260—683.15 D     3 Claims

ABSTRACT OF THE DISCLOSURE

Process for the production of $C_5$–$C_8$-olefins by the catalytic codimerization of a mixture of ethene and optionally propene in the presence of a catalyst system containing (a) a nickel haloacetate, (b) an aluminum alkyl halide and (c) a Lewis base selected from the group consisting of alkyl and cycloalkyl phosphines in a reaction zone with a butene concentration equal to or higher than the butene concentration at which the conversion of butene to higher olefins takes place at the same rate as the formation of butenes by dimerization of the ethene in the reaction zone, separating normal butenes from the resultant olefin mixture, recycling the thus-produced normal butenes from the reaction zone and recovering the $C_5$ to $C_8$-olefin reaction product.

This invention relates to a process for the production of $C_5$–$C_8$-olefines and is particularly suitable for the production of 3-methylpentenes, and especially the simultaneous production of 3-methylpentenes and isopentenes.

As used herein, the term "3-methylpentenes" also comprises the double-bond-isomeric compound 2-ethyl-butene-1.

The isopentenes and 3-methylpentenes, particularly 3-methylpentene-2, are valuable raw materials having a vital importance both as gasoline additives and particularly as organic intermediates. Thus, for example isopentene can be dehydrogenated and 3-methylpentene-2 demethanized to isopentene which is an important compound in the synthetic rubber industry.

Methods of producing isopentenes and 3-methylpentenes separately are known. Thus, for example, ethene and propene can be codimerized by reaction with aluminium trialkyl at higher temperatures and pressures (Belgian Pat. No. 622,435). From U.S. Pat. No. 3,087,978 it is known that ethene and butene-1- can be codimerized by using alkali-metal catalysts at temperatures above 100° C., preferably at a temperature between 150 and 225° C.

We have now found a method which by the use of selective catalysts and suitable reaction conditions makes it possible to prepare $C_5$–$C_8$-olefines in good yields from a mixture of ethene and butene and optionally propene under very mild reaction conditions. The olefines or olefine mixtures formed in the cracking reactions of higher hydrocarbons from a natural raw material basis for this process. An important advantage of the process is that all the olefines formed directly as main products in such reactions can be used simultaneously and converted into valuable organic intermediates. Thereby the process is provided with a cheap and easily available raw material on a large industrial scale.

The reactions primarily occurring in the process according to the invention are the following:

(1) Dimerization of ethene to $C_4$-olefines.
(2) Codimerization of ethene and propene to $C_5$-olefines.
(3) Codimerization of ethene and butene to $C_6$-olefines.
(4) Dimerization of propene to $C_6$-olefines.
(5) Codimerization of propene and butene to $C_7$-olefines.
(6) Dimerization of butene to $C_8$-olefines.
(7) Formation of higher olefines.

Normally the formation of $C_4$-olefines by dimerization of ethene (reaction 1) will occur much faster than the further conversion of $C_4$-olefines into higher products (reactions 3, 5 and 6). This means that the C-olefines must be considered as reaction product, which undoubtedly will be an uneconomical feature due to the relatively low price obtainable for butene, when the purpose of the process is to produce the higher and more valuable $C_5$–$C_8$-olefines.

According to the invention is provided a process for the production of $C_5$–$C_8$-olefines by catalytic codimerization of a mixture of ethene and butene and, if desired, propene. The process is characterized in that for the catalytic reaction in a reaction zone is used a butene concentration equal to or higher than the butene concentration at which the conversion of butene to higher olefines takes place at the same rate as the formation of butenes by dimerization of ethene in the reaction zone ($[C_4]_{crit}$, as defined hereinbelow), with the formation of an olefine mixture from which the normal butenes are separated and recryled to the reaction zone, while the $C_5$ to $C_8$-olefines are recovered as reaction product.

The concentration of butene, at which the formation of $C_4$-olefines is as rapid as the further conversion of $C_4$-olefines to higher olefines, has in the following been called the critical butene concentration $[C_4]_{crit}$, and on the basis of reaction kinetic considerations of the conditions in the reaction zone wherein the olefines ethene, propene and butene are present, is given by the following condition:

$$\frac{d[C_4]}{dt}=\frac{d[C_6]}{dt}+\frac{d[C_7]}{dt}+2\frac{d[C_8]}{dt} \quad (I)$$

i.e.

$k_{22}$ [Cat] $[C_2]^2 = k_{24}$ [Cat] $[C_2]$ $[C_4]_{crit.}$
$\qquad + k_{34}$ [Cat] $[C_3]$ $[C_4]_{crit.} + 2k_{44}$ [Cat] $[C_4]^2_{crit.}$ (II)

where $k$=rate constant, and the square brackets represent the concentration of the material. Since the formation of olefines higher than $C_8$ is very small, it is not taken into consideration. By chosing suitable catalysts it is possible to make the formation of $C_7$-olefines, $$\frac{d[C_7]}{dt}$$

and the formation of $C_8$-olefines, $$\frac{d[C_8]}{dt}$$

small compared to the formation of $C_6$-olefines. The critical butene concentration can therefore be expressed approximately by $\qquad k_{22}$ $[C_2] = k_{24}$ $[C_4]_{crit.}$ (III)

i.e.

$\qquad [C_4]_{crit.} = \dfrac{k_{22}}{k_{24}} [C_2]$ (IV)

where $k_{22}$ and $k_{24}$ are reaction rate constants for the formation of $C_4$-olefines from ethene and the further conversion of $C_4$-olefines to $C_6$-olefines respectively, and $[C_2]$ is the concentration of ethene in the reaction zone.

Since a successful operation of the process depends upon that $[C_4]_{crit}$ is relatively low compared with the upper limit which is given by the concentration in liquid butene (about 12 moles/l.), it is important that the ratio $k_{22}/k_{24}$ is as low as possible when a suitable catalyst system is chosen.

From Equation IV it appears that the value of $[C_4]_{crit}$ with a given catalyst system is directly dependent upon the ethene concentration, $[C_2]$, in the reaction zone. In a continuous process where the ethene feed rate is constant, the ethene concentration is determined by the ratio between the ethene feed rate and the ability of the reaction mixture to convert ethene.

According to the present invention it is possible to increase the ability of the reaction mixture to convert ethene to valuable products by passing propene also into the reaction mixture, whereby some of the introduced ethene is used for the formation of isopentene. Thereby the ethene concentration in the reaction zone decreases, and this causes a lowering of $[C_4]_{crit}$.

From an operational, as well as from an economic point of view, it is favourable for the process that the critical butene concentration is as low as possible, since thereby both reactor volume, fractionation and recycling of butene from the fractionation unit to the reaction zone is saved. By means of the present invention it is possible to make the above reactions 2 and 3 strongly preferred, at the same time adjusting these reactions to give a good yield of $C_5$-olefines having isopentene structure (up to 95% of the $C_5$-olefines) and $C_6$-olefines having 3-methyl pentene structure (up to 97% of $C_6$-olefines).

For the reaction of ethene and butene with the formation of 3-methylpentenes and for the reaction of ethene, propene and butene with simultaneous formation of isopentenes and 3-methyl pentenes suitable catalyst systems are formed, for instance by a reaction between a nickel compound, a compound of trivalent phosphorus and a Lewis acid. Characteristic for particularly suitable catalyst systems is the use of a nickel compound which may be coupled with the phosphorus compound in the form of a phosphine or a phosphorus trihalide with the formation of soluble nickel-phosphorus-addition compounds, and the use of a compound of aluminium as Lewis acid.

The following are examples of such nickel compounds and their reactions with the above mentioned types of phosphorus compounds:

(1) $NiBr_2 + 2P(tert\text{-}butyl)_3 \rightarrow [P(tert\text{-}butyl)_3]_2NiBr_2$
(2) $NiSO_4 + 2P(n\text{-}butyl)_3 \rightarrow [P(n\text{-}butyl)_3]_2NiSO_4$
(3) $NiNO_2 + 2P(N\text{-}(ethyl)_2)_3 \rightarrow [P(N\text{-}(ethyl)_2)_3]_2NiNO_2$
(4) $Ni(Cl\text{-}acetate)_2 + 2P(cyclohexyl)_3 \rightarrow$
$\qquad [P(cyclohexyl)_3]_2Ni(Cl\text{-}acetate)_2$
(5) $Ni(CO)_4 + 4PCl_3 \rightarrow Ni[PCl_3]_4 + 4CO$
(6) $Ni(CO)_4 + 2P(cyclohexyl)_3 + CS_2 \rightarrow$
$\qquad [P(cyclohexyl)_3]_2Ni \cdot CS_2 + 4CO$ These reactions can either be performed separately or in situ in the reaction mixture, preferably the nickel-phosphorus compounds are prepared separately in those cases where the original nickel compound is slightly soluble in the reaction medium and where the formation of the nickel-phosphorus compound takes place slowly.

Due to the selective formation of isopentenes and 3-methylpentenes it is advantageous to employ an excess of phosphines beyond the extent at which they are attached to the nickel compound. Suitable phosphines are usually characterized by a great Lewis base strength, such as for instance tri-methyl-phosphine, tri-isopropyl-phosphine, tri-tert.-butylphosphine, tri(di-ethylamino)phosphine, 1.5-bis-dicyclohexyl-phosphino-pentene, tri - cyclohexylphosphine and analogous compounds. As the Lewis acid is suitably employed one or more compounds of the type $Al(R)_n(X)_{3-n}$ where $n = 0\text{-}2$, R = aliphatic or aromatic hydrocarbon radical containing from 1 to 50 carbon atoms, and X = monobasic acid radical, preferably halogen and/or alcoholate such as $Al(CH_3)_2Cl$, $Al(C_2H_5)Cl_2$, $Al(phenyl)(C_4H_9)Cl$, $Al(O\text{—}C_2H_5)(C_2H_5)Cl$, $$Al(n\text{-}C_8H_{17})_2Cl$$

$Al(iso\text{-}C_3H_7)Br_2$ and $Al(C_2H_5)I_2$.

The phosphine compounds can either be added to the reaction mixture alone or together with the aluminium compound, optionally in the form of Al-phosphine addition compounds such as $Al(C_2H_5)Cl_2 \cdot P(C_6H_{11})_3$ and $Al(phenyl)(C_4H_9)Cl \cdot P(n\text{-}butyl)_3$.

The concentration of the nickel compound can be chosen in the range $10^{-6}$ to $10^{-1}$ mole per liter reaction mixture, where concentrations in the range $10^{-5}$ to $10^{-2}$ mole per liter are favourable and concentrations in the range $10^{-4}$ to $10^{-2}$ mole per liter are most suitable. The molar ratio between the nickel compound and the aluminium compound should be chosen so that it is less than one. Ni/Al is chosen preferably from the range 1/2–1/100.

The amount of phosphine added to the reaction mixture in excess of the phosphine which may be attached to the nickel in advance, should be chosen so that the molar ratio between phosphine and aluminium is less than 1.5. This ratio is most effectively chosen from the range 1/1–1/5.

The process of the invention may be carried out either discontinuously or continuously. One or more reaction zones in series may be employed. The catalyst and possible solvent can suitably be separated from the reaction products by fractional distillation.

The temperature in the reaction zone can be varied from −50° C. to 150° C., while the temperature from 0° C. to 120° C. is favourable, and temperatures between 20° C. and 100° C. are most suitable.

The reaction pressure is adjusted according to the rate of reaction taking into special consideration the construction of the apparatus with respect to the removal of the heat of reaction. In practice pressures up to 100 atm. can be used, while pressures between 1 atm. and 40 atm. are favourable, and pressures between 1 atm. and 20 atm. are more suitable.

The process can be performed with or without the use of solvents. Suitable solvents comprise aliphatic, alicyclic and aromatic hydrocarbons and their halogen-derivatives and compounds of similar type. Benzene, toluene, chlorobenzene, bromobenzene, n-heptane, xylene, methylenechloride, dichloroethane and the like are particularly suittable solvents. However, the process is preferably performed by using $C_6$-, $C_7$ or higher reaction products as solvent.

The catalyst component can either be added to the reaction mixture directly or in the form of a solution in a suitable solvent.

The process is characterized by a great flexibility with respect to the choice of the composition of the starting material. However, in the preparation of isopentenes and 3-methylpentenes the ratio between ethene and propene in the reaction zone should be chosen so that a satisfactory formation of $C_5$-olefines is obtained without a too rapid dimerization of propene to $C_6$-olefines. Suitably the molar ratio between propene and ethene in the reactor is less than 2. It is most advantageous to choose the molar ratio of propene/ethene from the range 1.5 to 0.25.

The butene concentration in the reaction zone should be adjusted according to the starting material, so that when using those raw material sources having the highest content of butenes the highest butene concentrations in the reaction zone are chosen. If the starting material is a pure mixture of ethene and propene the average butene concentration is chosen equal to the critical butene concentration maintained in the reaction zone by recycling of butenes from the fractionating zone. If the starting material in addition to ethene and propene also contains butene, the choice of concentration of butene in the reaction zone should be higher than the critical butene concentration and such that the more butene the starting material contains the higher the chosen butene concentration.

As butenes can be used the normal butenes, butene-1, butene-2 cis and butene-2 trans and mixtures of these. Due to the selective formation of 3-methylpentenes, a butene mixture having a high content of the butene-2 isomers is suitably employed. When choosing a catalyst system giving a high yield of butene-1 it may be suitable to subject the butene mixture which is recycled to the reaction zone, to a double-bond isomerization, whereby butene-1 is converted to butene-2.

A discontinuous process may for example be performed by passing ethene and propene for for instance ¼ to 5 hours into a reactor in which butene is present in a concentration higher than the critical butene concentration together with a catalyst and possible solvent, and then separating the reaction product from the catalyst by the usual methods such as fractional distillation. During the first part of the reaction the total amount of butene in the reactor will decrease until the critical butene concentration has been reached. After this time the total amount of butene will rise, and after a definite reaction period it will be equal to the original amount of butene which was present in the reactor before the reaction was started. In those processes where butene is to be used as starting material the reaction must therefore be interrupted after a reaction period shorter than the one mentioned above. The butene is suitably recycled to the reactor for the next run, and the butene consumed is compensated by additions from the starting material source. The $C_5$ and $C_6$-olefines are recovered as reaction product. The higher olefines and possible solvent are recovered or partly recycled together with the catalyst to the reactor to be used in the next run.

The drawing represents a flow-sheet exemplifying how the process may be carried out continuously. Referring to the numbers in the drawing, the catalyst components and solvent are mixed in zone 3. The nickel component is added from zone 1 and the aluminium component together with the phosphorus compound are added from zone 2. Solvent is added from zone 15 The catalyst is passed continuously into reaction zone 7 via line 16 to the extent necessary to replace the catalyst consumed. The catalyst together with minor amounts of higher olefines and possibly solvent are also recycled continuously back to the reaction zone via line 24 from separation zone 8. Fresh ethene, propene and butene are introduced into the reaction zone from zones 4, 5 and 6 via lines 17, 18 and 19 respectively, while unreacted ethene, propene and butene are recycled to the reaction zone via line 20 and, if desired, subjected to an isomerization in zone 26 before being recycled.

In zone 7 ethene, propene and butene undergo a catalyzed reaction with the formation of a reaction product consisting primarily, from 70 to 99%, of normal butenes, $C_5$-olefines (of which 70 to 95% have isopentane structure), and $C_6$-olefines (of which 60 to 97% have 3-methylpentane structure), and in addition minor amounts of $C_7$- and higher olefines. The average residence time for the reactants in zone 7 is adjusted so that the above product composition is obtained. The reaction mixture is removed continuously via line 21 to separation zone 8. In zone 8 unreacted ethene, propene and butene together with the $C_5$- and $C_6$-olefines are separated from the reaction mixture. The distillation conditions on the top of the column are suitably chosen in the temperature range from 20 to 100° C. at a pressure from 0.15 to 2.0 atm. The top fraction from separation zone 8 is passed via line 22 to separation zone 9 where the $C_5$- and $C_6$-olefines are separated from the components having lower boiling points and passed via line 23 to a separation zone 10 where the $C_5$-olefines consisting primarily of isopentenes are recovered as top fraction and passed to storage zone 11. The $C_6$-olefines consisting primarily of 3-methylpentenes are recovered in the form of the higher boiling point fraction and passed to storage zone 12. Suitable distillation conditions at the top of columns 9 and 10 are from about 5° C. and from about 45° C. respectively at normal pressure. The bottom fraction from column 8 is partly recycled to the reaction zone 7 and partly via line 25 in which the solvent is separated from the higher olefines, consisting primarily of $C_7$- and $C_8$-olefines, and then passed via line 27 to zone 3 for further use. The catalyst is removed with the bottom fraction from column 15 and can be discarded. In the above example a solvent having a lower boiling point than the lowest boiling $C_7$ in the reaction mixture is used. When choosing a solvent having a boiling point between the $C_7$- and $C_8$-olefines the solvent may be effectively recovered as an intermediate fraction. $C_7$-, $C_8$- and higher olefines are passed for storage in zones 13 and 14 respectively.

The consumption of catalyst in the process is very low. When pure starting materials are used, it is possible to obtain conversions giving $10^3$ to $10^4$ kg. of product per kg. nickel compound.

The following examples illustrate the invention further:

EXAMPLE 1

107 mg. of [P(cyclohexyl)$_3$]$_2$ Ni(Cl-acetate)$_2$ were charged to a 1 liter steel autoclave, the autoclave was then evacuated for about one hour to less than $10^{-2}$ mm. Hg. 160 g. of purified butene from a small pressure-container (1000 cm.$^3$) were sucked into the autoclave. The autoclave was then heated to 40° C. by means of a water bath in which the temperature was maintained constant ±1° C. during the entire run. From a small pressure-container (25 cm.$^3$) 635 mg. of Al(C$_2$H$_5$)Cl$_2$+700 mg. of P(cyclohexyl)$_3$ dissolved in 10 grams of chlorobenzene were then pressed into the autoclave by means of ethene overpressure. The reaction was started immediately thereafter by passing a gaseous mixture of ethene and propene into the autoclave. The gas mixture consisting of two parts by volume of ethene and one part by volume of propene was passed into the autoclave at a constant rate of 0.8 normal liter per minute. By means of an internal cooling coil the temperature in the reaction mixture was maintained constant at 40±1° C. The pressure in the autoclave during the run varied from 2.8 to 1.8 kg.·cm.$^{-2}$.

After a reaction time of 60 minutes the run was stopped, and the reaction mixture was treated by means of fractional distillation, and the individual fractions were gas-chromatographically analyzed.

Reaction product:

137.2 g. C$_4$-olefines (of which 3.0% butene-1, 30% butene-2-cis and 67% butene-2-trans)

40.0 g. C$_5$-olefines (of which 90% isopentenes and 10% normal pentenes)

40.7 g. C$_6$-olefines (of which 81% 3-methylpentenes, 9% normal hexenes, 5% 2.3-dimethylbutenes and 5% 2-methylpentenes)

12.1 g. C$_7$-, C$_8$- and higher olefines.

The C$_4$-olefines were transferred to a 1000 cm.$^3$ pressure container and were used in Example 2 together with fresh butene from the source of the starting material.

EXAMPLE 2

Process as described in Example 1.

Temperature: 40° C. Pressure: 3–2 kg·cm.$^{-2}$
Monomer: Ethene and 160 g. butene.
Rate of introduction of ethene: 1 normal liter·min.$^{-1}$
Catalyst:
 86.4 mg. of [P(but)$_3$]$_2$ Ni(Cl-acetate)$_2$ 635 mg. of Al(C$_2$H$_5$) Cl$_2$ ⎫
 253 mg. of P(but)$_3$       ⎬ 13.3 g. chlorobenzene
 175 mg. of P(cyclohexyl)$_3$ ⎭

The results of the run has been tabulated in the following:

| Time, min. | Temp., °C. | Pressure, atm. | Percent C₄ | Percent C₆ | Percent C₈ | Grams C₄ | Grams C₆ | Grams C₈ |
|---|---|---|---|---|---|---|---|---|
| 0 | 39.3 | 4.3 | 100 | 0 | 0 | 160 | 0 | 0 |
| 15 | 40.0 | 3.2 | 80.9 | 15.6 | 3.5 | 145.7 | 18.0 | 6.4 |
| 30 | 40.2 | 3.1 | 77.2 | 21.9 | 3.9 | 138.4 | 48.4 | 7.6 |
| 45 | 40.0 | 3.0 | 66.4 | 29.4 | 4.2 | 138.4 | 61.4 | 8.7 |
| 60 | 40.0 | 2.9 | 62.4 | 32.8 | 4.8 | 139.0 | 72.9 | 10.6 |
| 90 | 39.7 | 2.8 | 58.3 | 37.8 | 3.9 | 148.1 | 96.0 | 10.0 |
| 120 | 40.2 | 2.9 | 60.0 | 35.5 | 4.5 | 171.2 | 101.3 | 12.8 |

Product composition (120 min.):

$C_4$-olefines: 97% butene-2 and 3% butene-1
$C_6$-olefines: 86% 3-methylpentenes and 14% n-hexenes.

What is claimed is:

1. In a process for the production of $C_5$–$C_8$-olefins by catalytic codimerization of a $C_2$–$C_4$ olefin mixture comprising ethene and butene the improvement which consists in carrying out the reaction in the presence of a catalyst system comprising
   (a) a nickel chloroacetate,
   (b) an aluminum alkyl halide, and
   (c) a Lewis base selected from the group consisting of alkyl and cycloalkyl phosphines
in a reaction zone with a butene concentration equal to or higher than the butene concentration at which the conversion of butene to higher olefins takes place at the same rate as the formation of butenes by dimerization of ethene in the reaction zone, separating normal butenes from the resultant olefin mixture, recycling said normal butenes to the reaction zone, and recovering $C_5$ to $C_8$-olefins as reaction product.

2. The process according to claim 1, wherein the olefin mixture contains propene.

3. The process according to claim 1, wherein the temperature in the reaction zone is 0° to 120° C. and the pressure is 1 to 100 atm.

References Cited

UNITED STATES PATENTS

| | | | |
|---|---|---|---|
| 2,881,234 | 4/1959 | Esmay et al. | 260—683.15 |
| 3,379,706 | 4/1968 | Wilke | 260—683.15 X |
| 3,432,572 | 3/1969 | Tazuma et al. | 260—683.15 |
| 3,485,881 | 12/1969 | Zuech | 260—683.15 X |

PAUL M. COUGHLAN, Jr., Primary Examiner

U.S. Cl. X.R.

252—431 P